United States Patent [19]

Weller

[11] Patent Number: 4,948,199

[45] Date of Patent: Aug. 14, 1990

[54] FORCE-LIMITING ENERGY ABSORBER ON A SAFETY BELT DEVICE

[75] Inventor: Hermann Weller, Alfdorf-Burgholz, Fed. Rep. of Germany

[73] Assignee: TRW Repa GmbH, Fed. Rep. of Germany

[21] Appl. No.: 297,765

[22] Filed: Jan. 17, 1989

[30] Foreign Application Priority Data

Jan. 22, 1988 [DE] Fed. Rep. of Germany ....... 3801858

[51] Int. Cl.⁵ ............................................. A62B 35/04
[52] U.S. Cl. .................................... 297/472; 297/483; 280/805
[58] Field of Search ............... 297/472, 471, 470, 482, 297/216, 468, 464, 483; 280/805; 188/371

[56] References Cited

U.S. PATENT DOCUMENTS

| 3,232,383 | 2/1966 | Moberg | 297/472 |
| 3,280,942 | 10/1966 | Millington | 297/472 |
| 3,308,908 | 3/1967 | Bunn | 297/472 |
| 3,438,674 | 4/1969 | Radke et al. | 297/472 |
| 4,385,775 | 5/1983 | Shimagawa et al. | 297/472 |

FOREIGN PATENT DOCUMENTS

| 1531516 | 12/1969 | Fed. Rep. of Germany | 297/472 |
| 2141668 | 3/1973 | Fed. Rep. of Germany | 297/472 |
| 2233421 | 1/1974 | Fed. Rep. of Germany | . |
| 2259664 | 6/1974 | Fed. Rep. of Germany | . |
| 2452336 | 5/1976 | Fed. Rep. of Germany | . |

Primary Examiner—Peter R. Brown
Assistant Examiner—Brian K. Green
Attorney, Agent, or Firm—Tarolli, Sundheim & Covell

[57] ABSTRACT

A force limiter comprises a stretch element which is inserted into the force flow path and which under tensile load by increasing its length deforms in force-limiting manner and the longitudinal ends of which are bridged by a stretch-limiting element with insertion of a clearance corresponding to the intended extension of the stretch element. By the stretch-limiting element the failure load of the force limiter is increased without influencing the tensile stress/elongation characteristic within the intended action range.

3 Claims, 1 Drawing Sheet

FORCE-LIMITING ENERGY ABSORBER ON A SAFETY BELT DEVICE

The present invention relates to a force-limiting energy absorber on a safety belt device with a stretch element which is inserted at its two longitudinal ends into the force flow path and which under tensile load deforms in force-limiting manner by increasing its length.

Force limiters of this type, known for example from German specification as laid open to inspection No. 2,233,421, comprise a stretch element which consists of stretch members arranged in a row in the direction of the tensile load. Under tensile load the stretch members are stretched in the longitudinal direction to absorb by material deformation a part of the kinetic energy liberated in a collision and to limit the tensile stress occurring in the belt system.

The force limiting is to start at relatively low values of the tensile load. This requirement can be met by using stretch members having a dimensional stability which is correspondingly low. However, at the same time an adequate failure load of the force limiter is required. Hitherto it has not been possible to meet both these requirements, i.e. starting of the force limitation even at relatively low tensile load and a high failure or ultimate load.

The present invention provides a force-limiting energy absorber for a safety belt device which permits the stretch element to start the force-limiting deformation under a relatively low tensile load but nevertheless ensures a high failure load.

In the energy absorber of the invention the two longitudinal ends of the stretch element are bridged by a stretch-limiting element with insertion of a clearance corresponding to the intended extension of the stretch element. The stretch-limiting element does not come into operation until this clearance has been overcome by the elongation of the stretch element taking place under load. The tensile load is then taken up largely by the stretch limiting element which is dimensioned for the desired high failure load. By the presence of the stretch-limiting element the tensile load/stretch characteristic of the stretch element and of the force limiter on the whole is thus not influenced within the intended working range of the stretch element. The stretch element can thus be optimized as regards its characteristic curve without at the same time having to take account of the requirement that said stretch element is to have a high failure load.

The stretch-limiting element is formed according to an advantageous embodiment by a strip of mechanically highly stressable material such as sheet steel. It can then be made as economic stamped part having a low weight and small space requirement.

If the stretch-limiting element is a part of high longitudinal rigidity, for example a steel sheet plate or a steel sheet strip, the clearance with which it bridges the two longitudinal edges of the stretch element is preferably established in that it is fixedly connected at its one end with the one longitudinal end of the stretch element and at its other end comprises a slot which has a length corresponding to the desired extension and into which a pin secured to the corresponding longitudinal end of the stretch element engages. The pin may be constructed as rivet by which the stretch element and the stretch-limiting element are held together at their respective longitudinal ends. At the opposite end the stretch element and the stretch-limiting element preferably each comprise an eye through which extends a threaded bolt or a rivet for securing a fitting or for securing to the vehicle bodywork. This embodiment is distinguished by great simplicity, low production costs and also by low space requirement because the stretch element and the stretch-limiting element can be placed directly on each other and secured together.

A further development of this embodiment resides in that the stretch-limiting element is formed as elongated cover plate of approximately the same form and size as the stretch element and is arranged to cover at least one side of the stretch element. For in particular when the stretch element is formed from a row of stretch members or links covering thereof is desirable. A separate cover may however be dispensed with if the stretch-limiting element formed as cover plate itself performs this function.

According to a likewise very simple and economically produceable embodiment the stretch-limiting element is constructed as tension-resistant flexible band or cable, the length of which is greater by the intended extension than the length of the stretch element and the ends of which are secured to the corresponding longitudinal ends of the stretch element by rivets or the like.

A force limiter having particularly advantageous properties is obtained when the stretch element is designed according to Applicants' U S. Pat. application Ser. No. 202,803 of June 3, 1988. The stretch element described therein consists of a row of stretch members or links each having an opening which is surrounded by a border deformable under tensile load and in which limit elements are disposed which limit in stop manner the deformation of the edge transversely of the direction of the tensile load. On the one hand, such a stretch element has the desired uniform profile of the tensile load/elongation characteristic within a well reproduceable effective range and on the other hand can be made as simple stamped part in economical manner.

Further features and advantages of the invention will be apparent from the following description of some embodiments and from the drawings to which reference is made and in which.

Figure 1:
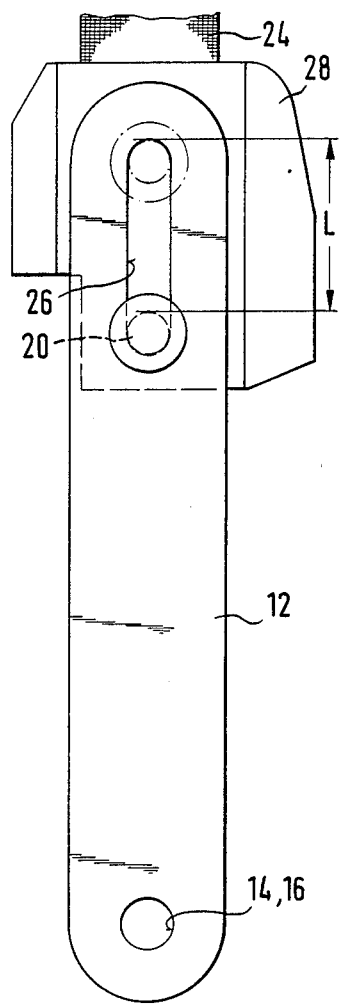
FIG. 1 is a plan view of a force limiter according to a embodiment.
Figure 2:
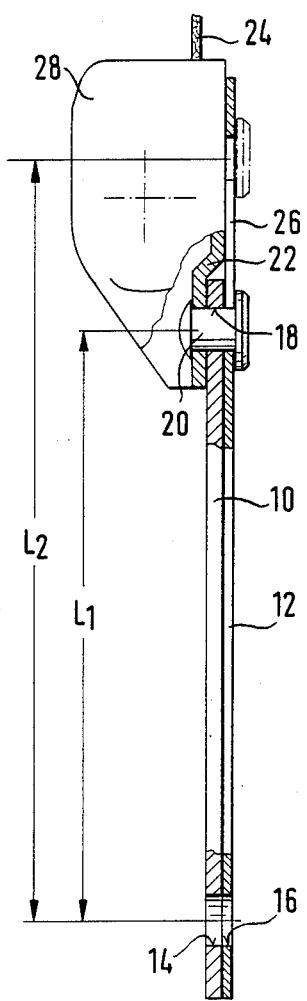
FIG. 2 is a longitudinal section of the force limiter shown in FIG. 1.

The main components of the force limiter shown in FIGS. 1 and 2 are a stretch element 10 consisting of a row of flat contiguous stretch members and a stretch-limiting element 12. The stretch-limiting element 12 is constructed as an elongated flat plate having a length greater than that of the stretch element 10. The stretch element 10 and stretch limiting element 12 are provided at their corresponding end each with an opening 14, 16 which forms an eye through which a threaded bolt, rivet or the like is inserted to join the two elements 10, 12 together and to a fitting or the vehicle bodywork. At the opposite longitudinal end the stretch element 10 comprises an opening 18 through which the pin-like portion of the rivet 20 extends. The pin-like portion of the rivet 20 also passes through an opening, in alignment with the opening 18, of a fitting 22 which serves to anchor belt webbing 24 and a slot 26 which is formed in the corresponding end of the stretch-limiting element 12. The remaining free distance L of the slot 26 corresponds to the intended elongation or extension of the stretch element 10 under a tensile load as is expected in a safety belt system in a vehicle collision. The same conditions can be simulated in a test apparatus. Before the tensile stress on the stretch element 10 the effective length thereof is $L_1$ defined by the distance of the axes of the openings 14, 18 and less by an amount L than the effective length $L_2$ after the tensile load. The state of the force limiter before the tensile load is shown in FIGS. 1 and 2 in full lines and the state after the tensile load in dashed line.

It is thus seen that the stretch-limiting element 12 bridges the stretch element 10 at its longitudinal ends with a clearance which corresponds to the intended extension L of the stretch element 10. The bridging does not become effective until this clearance has been overcome and the pin-like portion of the rivet 20 strikes the end of the slot 26. The rivet 20 simultaneously ensures the holding together of stretch element and stretch-limiting element 12, the guiding of the two parts relatively to each other in the longitudinal direction and their securing to the fitting 22.

The stretch-limiting element 12 may be stamped as narrow strip from a steel sheet or the like. It preferably forms at the same time a cover of the stretch element 10. It can engage round the two narrow sides thereof and if desired also cover the back. This gives a very compact flat design easily integrated into a vehicle.

As indicated in FIGS. 1 and 2 the fitting 22 may be covered by a cap 28 or the like. In another embodiment the fitting 22 forms the anchor plate of a belt lock which is anchored via the force limiter to a vehicle seat or to the vehicle floor.

Figure 3:
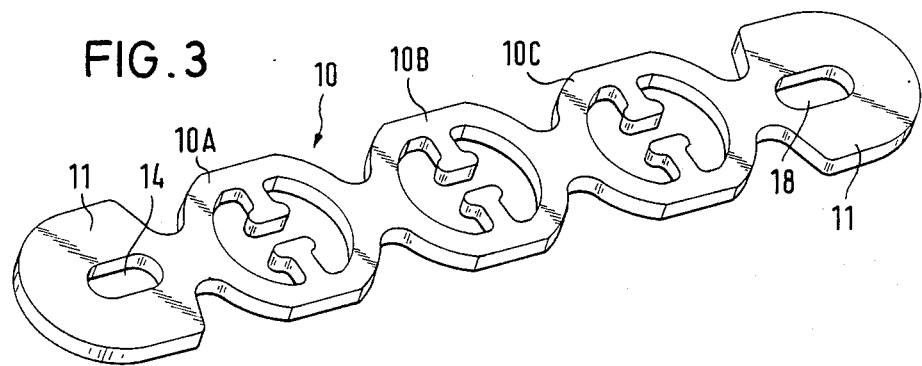
FIG. 3 is a perspective view of a particular embodiment of a stretch element used in a force limiter according to FIGS. 1 and 2.

A particularly expedient embodiment of the stretch element 10 is shown in FIG. 3. It consists of a plurality, for example three, of flat stretch members or links 10A, 10B, 10C arranged in a row between two securing plates 11 forming the longitudinal ends. The stretch element 10 is preferably also made as simple stamped part from metal sheet. Each stretch member 10A, 10B, 10C consists of an annular border surrounding an opening into which mushroomlike limiting elements project. These mushroom-like limiting elements have the function of limiting in stop-manner the deformation of the deformable border transversely of the direction of the tensile load by engaging each other.

In a further embodiment not shown in the drawings because of its simplicity the stretch-limiting element is constructed as flexible band or cable having a length greater by the intended extension L than the length of the stretch element 10 and having ends secured to the corresponding longitudinal ends of the stretch element by rivets or the like.

I claim:

1. A force-limiting energy absorber for safety belt systems comprising two end fittings, a plurality of stretch members which are connected in series between a first one and a second one of said end fittings and adapted to be stretched under tensile load form the belt system through a predetermined desired extension length, each of said stretch members defining an opening surrounded by a flat boarder portion deformable under tensile load, a stretch-limiting element having a first end connected to said first end fitting and a second end provided with a longitudinally extending slot, said slot having a length which corresponds to said predetermined desired extension length, and a pin connected with a second one of said end fittings and engaging into said slot, said first end fitting and said first end of said stretch-limiting element each having an opening for joint connection to a fitting or motor vehicle part, the other of said end fittings being provided with a belt webbing securing fitting.

2. A force-limiting energy absorber for safety belt systems comprising two end fittings, a plurality of stretch members which are connected in series between a first one and a second one of said end fittings and adapted to be stretched under tensil load from the belt system through a predetermined desired extension length, each of said stretch members defining an opening surrounded by a flat boarder portion deformable under tensile load, a stretch-limiting element comprising a piece of mechanically highly stressable material such as a steel sheet from which said element is stamped out in the form of an elongated cover plate which covers at least one side of said plurality of stretch members, said stretch-limiting element having a first end connected to said first end fitting and a second end provided with a longitudinally extending slot, said slot having a length which corresponds to said predetermined desired extension length, a pin being connected with a second one of said end fittings and engaging into said slot, and said first end fitting and said first end of said stretch-limiting element being each provided with an opening for joint connection to a fitting or motor vehicle part, the other of said end fittings being provided with a belt webbing securing fitting.

3. The force-limiting energy absorber of claim 2 wherein each of said stretch members has absorber portion with an inner wall, a pair of limiting elements projecting into said opening from opposite sides of said border portion in a direction transverse to the longitudinal direction of said energy absorber, each limiting element having a base portion connected to said inner wall of said border portion and a head portion which prior to deformation of said stretch members under tensile load is spaced from the head portion of the other of said pair of limiting elements and, after said deformation, abuts the head portion of said other of said pair of limiting elements.

* * * * *

UNITED STATES PATENT AND TRADEMARK OFFICE
CERTIFICATE OF CORRECTION

PATENT NO. : 4,948,199

DATED : August 14, 1990

INVENTOR(S) : Hermann Weller

It is certified that error appears in the above-identified patent and that said Letters Patent is hereby corrected as shown below:

Column 4, Line 5, Claim 1, change "form" to --from--.

Column 4, Line 8, Claim 1, change "boarder" to --border--.

Column 4, Line 45, Claim 3, change "absorber" to -- a border--.

Signed and Sealed this

Twenty-seventh Day of August, 1991

Attest:

HARRY F. MANBECK, JR.

Attesting Officer

Commissioner of Patents and Trademarks